(12) United States Patent
Brougham et al.

(10) Patent No.: US 8,253,958 B2
(45) Date of Patent: Aug. 28, 2012

(54) SCHEDULING SYSTEM

(75) Inventors: Alex Scott Brougham, Webster, NY (US); Dusan G. Lysy, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1512 days.

(21) Appl. No.: 11/796,910

(22) Filed: Apr. 30, 2007

(65) Prior Publication Data

US 2008/0266592 A1 Oct. 30, 2008

(51) Int. Cl.
*G06F 3/12* (2006.01)
*G06K 15/00* (2006.01)
*G03G 15/00* (2006.01)

(52) U.S. Cl. ............... 358/1.15; 358/1.13; 358/1.14; 714/44

(58) Field of Classification Search ........ 358/1.11–1.18; 400/74; 714/44
See application file for complete search history.

(56) References Cited

U.S. PATENT DOCUMENTS

| | | |
|---|---|---|
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,008,713 A | 4/1991 | Ozawa et al. |
| 5,080,340 A | 1/1992 | Hacknauer et al. |
| 5,095,342 A | 3/1992 | Farrell et al. |
| 5,150,167 A * | 9/1992 | Gonda et al. ............ 399/16 |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,710,968 A | 1/1998 | Clark et al. |
| 5,778,377 A | 7/1998 | Marlin et al. |
| 5,884,910 A | 3/1999 | Mandel |
| 5,995,721 A | 11/1999 | Rourke et al. |
| 6,059,284 A | 5/2000 | Wolf et al. |
| 6,125,248 A | 9/2000 | Moser |
| 6,241,242 B1 | 6/2001 | Munro |
| 6,297,886 B1 | 10/2001 | Cornell |
| 6,341,773 B1 | 1/2002 | Aprato et al. |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.
Desmond Fretz, "Cluster Printing Solution Announced"; Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.

(Continued)

*Primary Examiner* — Satwant Singh
(74) *Attorney, Agent, or Firm* — Fay Sharpe LLP (57) ABSTRACT

Described herein is a printing system comprising a plurality of print processing modules which selectively transfer print media therebetween during printing and a system controller that tracks process control protocols of each of the plurality of modules and compares to a scheduled job run and selectively alters a control variable of at least one of the process control protocols thereby preemptively altering initiation of at least one process control protocol to process the job run uninterrupted.

17 Claims, 2 Drawing Sheets

U.S. PATENT DOCUMENTS

| | | | |
|---|---|---|---|
| 6,384,918 B1 | 5/2002 | Hubble, III et al. | |
| 6,450,711 B1 | 9/2002 | Conrow | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,652,169 B2 * | 11/2003 | Parry | 400/74 |
| 6,819,906 B1 | 11/2004 | Herrmann et al. | |
| 6,925,283 B1 | 8/2005 | Mandel et al. | |
| 6,959,165 B2 | 10/2005 | Mandel et al. | |
| 6,973,286 B2 | 12/2005 | Mandel et al. | |
| 7,024,152 B2 | 4/2006 | Lofthus et al. | |
| 7,123,873 B2 | 10/2006 | deJong et al. | |
| 7,162,172 B2 | 1/2007 | Grace et al. | |
| 7,188,929 B2 | 3/2007 | Lofthus | |
| 7,206,532 B2 | 4/2007 | Lofthus et al. | |
| 7,206,536 B2 | 4/2007 | Julien | |
| 7,243,270 B2 * | 7/2007 | Taniguchi et al. | 714/44 |
| 7,929,874 B2 * | 4/2011 | Takiguchi et al. | 399/34 |
| 2001/0024296 A1 | 9/2001 | Sugiyama | 358/1.16 |
| 2002/0078012 A1 | 6/2002 | Ryan et al. | |
| 2002/0103559 A1 | 8/2002 | Gartstein | |
| 2003/0002881 A1* | 1/2003 | Hirose et al. | 399/44 |
| 2003/0077095 A1 | 4/2003 | Conrow | |
| 2004/0061892 A1* | 4/2004 | Ferlitsch | 358/1.15 |
| 2004/0061895 A1* | 4/2004 | Sugimoto | 358/1.15 |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0247365 A1 | 12/2004 | Lofthus et al. | |
| 2005/0141013 A1* | 6/2005 | Kikuchi et al. | 358/1.14 |
| 2006/0066885 A1 | 3/2006 | Anderson et al. | |
| 2006/0067756 A1 | 3/2006 | Anderson et al. | |
| 2006/0067757 A1 | 3/2006 | Anderson et al. | |
| 2006/0114313 A1 | 6/2006 | Moore | |
| 2006/0114497 A1 | 6/2006 | Anderson et al. | |
| 2006/0115287 A1 | 6/2006 | Roof | |
| 2006/0115288 A1 | 6/2006 | Roof | |
| 2006/0132815 A1 | 6/2006 | Lofthus et al. | |
| 2006/0176336 A1 | 8/2006 | Moore et al. | |
| 2006/0197966 A1 | 9/2006 | Viturro et al. | |
| 2006/0209101 A1 | 9/2006 | Mizes | |
| 2006/0214359 A1 | 9/2006 | Clark | |
| 2006/0214364 A1 | 9/2006 | Clark et al. | |
| 2006/0215240 A1 | 9/2006 | Mongeon | |
| 2006/0221159 A1 | 10/2006 | Moore et al. | |
| 2006/0221362 A1 | 10/2006 | Julien et al. | |
| 2006/0222384 A1 | 10/2006 | Moore et al. | |
| 2006/0222393 A1 | 10/2006 | de Jong et al. | |
| 2006/0227350 A1 | 10/2006 | Crawford et al. | |
| 2006/0230201 A1 | 10/2006 | Fromherz et al. | |
| 2006/0230403 A1 | 10/2006 | Crawford et al. | |
| 2006/0233569 A1 | 10/2006 | Furst et al. | |
| 2006/0235547 A1 | 10/2006 | Hindi et al. | |
| 2006/0238778 A1 | 10/2006 | Mongeon et al. | |
| 2006/0244980 A1 | 11/2006 | Grace | |
| 2006/0250636 A1 | 11/2006 | Richards | |
| 2006/0268317 A1 | 11/2006 | Lofthus et al. | |
| 2006/0268318 A1 | 11/2006 | Lofthus et al. | |
| 2006/0269310 A1 | 11/2006 | German et al. | |
| 2006/0274334 A1 | 12/2006 | Mongeon | |
| 2006/0274337 A1 | 12/2006 | Dalal et al. | |
| 2006/0280517 A1 | 12/2006 | Roof et al. | |
| 2006/0285159 A1 | 12/2006 | Frankel | |
| 2006/0285857 A1 | 12/2006 | Swift | |
| 2007/0002085 A1 | 1/2007 | Sampath et al. | |
| 2007/0002344 A1 | 1/2007 | Klassen | |
| 2007/0002403 A1 | 1/2007 | Klassen | |
| 2007/0024894 A1 | 2/2007 | Moore et al. | |
| 2007/0031170 A1 | 2/2007 | deJong et al. | |
| 2007/0041745 A1 | 2/2007 | Dalal et al. | |
| 2007/0052991 A1 | 3/2007 | Goodman et al. | |
| 2008/0174802 A1* | 7/2008 | Sampath et al. | 358/1.13 |

OTHER PUBLICATIONS

U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.
U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.
U.S. Appl. No. 11/528,770, filed Sep. 27, 2006, Degruchy.
U.S. Appl. No. 11/595,630, filed Nov. 9, 2006, Moore.
U.S. Appl. No. 11/590,432, filed Oct. 31, 2006, Moore.
U.S. Appl. No. 11/636,747, filed Dec. 11, 2006, Mestha et al.
U.S. Appl. No. 11/636,901, filed Dec. 11, 2006, Banton et al.
U.S. Appl. No. 11/639,073, filed Dec. 14, 2006, Biegelsen et al.
U.S. Appl. No. 11/643,119, filed Dec. 21, 2006, Clark et al.
U.S. Appl. No. 11/656,992, filed Jan. 23, 2007, Sampath et al.
U.S. Appl. No. 11/708,298, filed Feb. 20, 2007, Lang.
U.S. Appl. No. 11/714,016, filed Mar. 5, 2007, Furst.

* cited by examiner

FIG. 1

FIG. 2

SCHEDULING SYSTEM

BACKGROUND

The following relates to printing systems. It finds particular application to tracking, predicting, and preemptive scheduling of jobs by monitoring the impending anticipated process control protocols or routine maintenance schedules of individual printing system components and accordingly altering or overriding the protocols of the individual printing system components available to process and schedule jobs.

In a typical xerographic system, such as a copying or printing device, an electronic image is transferred to a print medium, such as paper, plastic, velum and the like. In a xerophotographic process, a photoconductive insulating member is charged to a uniform potential and exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with developing powder referred to in the art as toner. This image may be transferred to a support surface, such as paper, to which the toner image is permanently affixed in a fusing process.

In a multicolor electrophotographic process, successive latent images corresponding to different colors are formed on the insulating member and developed with a respective toner. Each single color toner image is transferred to the paper sheet in superimposed registration with the prior toner image. For simplex printing, only one side of a sheet is printed, while for duplex printing, both sides are printed. Other printing processes are known in which the electronic signal is reproduced as an image on a sheet by other means, such as through impact (e.g., a type system or a wire dot system), or through use of a thermosensitive system, ink jets, laser beams, or the like.

A conventional approach to increasing printing throughput is to increase the speed of the printer. However, increasing printer speed typically results in greater stress on the individual components of the printer. Another approach is to employ several marking engines, which can be vertically and/or horizontally stacked, within a printing platform. Multiple marking engine systems provide relatively higher overall output by parallel printing processes, wherein portions of the same document are printed on multiple printers or concurrently processing multiple print jobs. For example, an electronic print job that includes color and monochrome portions may be partitioned and distributed across color and monochrome printers. Print media substrate (e.g., paper, velum, plastic . . . ) is fed from a common or different source to the printers. Printed substrate is conveyed to a finisher where the media associated with a single print job are assembled. Such systems are commonly referred to as "tandem engine" printers, "integrated parallel" printers, or "cluster printing" printers.

In a conventional single engine system, when a print engine is disabled or scheduled for process control protocols/routine maintenance, the system shuts down. During periods of down time, print jobs are delayed, which results in customer annoyance, decreased customer utility, and loss in revenue. This problem is exacerbated when considered in light of a population of printing platforms. With a conventional multi-engine system, a faulty or unavailable print engine is by-passed. Print jobs associated with the unavailable print engine are re-routed to one or more available print engines. In U.S. Pat. No. 5,150,167, by Gonda, et al., and entitled "Image Forming Apparatus," print jobs are re-routed in order to maintain continuous printing operation. However, Gonda, et al. merely determines whether a printer is able to continue processing an on-going print job based on lack of paper, low toner, etc. If not, the print job is routed to another printer that is associated with a tray with paper, a cartridge with toner, etc. In addition, simply by-passing an unavailable print engine reduces processing performance, overall throughput, and causes out of sequence print runs which can result in purging of print jobs or partial print jobs.

CROSS REFERENCE TO RELATED PATENTS AND APPLICATIONS

The following applications, the disclosures of each being totally incorporated herein by reference, are mentioned:

U.S. application Ser. No. 10/924,458, filed Aug. 23, 2004, entitled "PRINT SEQUENCE SCHEDULING FOR RELIABILITY," by Robert M. Lofthus, et al.;

U.S. application Ser. No. 11/069,020, filed Feb. 28, 2004, entitled "PRINTING SYSTEMS," by Robert M. Lofthus, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/522,171, filed, entitled "FAULT MANAGEMENT FOR A PRINTING SYSTEM", by Meera Sampath et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards;

U.S. application Ser. No. 11/136,821, filed May 25, 2005, entitled "AUTOMATED PROMOTION OF MONOCHROME JOBS FOR HLC PRODUCTION PRINTERS," by David C. Robinson;

U.S. application Ser. No. 11/136,959, filed May 25, 2005, entitled "PRINTING SYSTEMS", by Kristine A. German et al.;

U.S. application Ser. No. 11/137,634, filed May 25, 2005, entitled "PRINTING SYSTEM", by Robert M. Lofthus et al.; and U.S. application Ser. No. 11/137,251, filed May 25, 2005, entitled "SCHEDULING SYSTEM", by Robert M. Lofthus et al.

U.S. application Ser. No. 11,170,845, filed Jun. 30, 2005, entitled "HIGH AVAILABILITY PRINTING SYSTEMS", BY Meera Sampath et al.

The following patents/applications, the disclosures of each being totally incorporated herein by reference are mentioned:

U.S. Publication No. US-2006-0114497-A1, Published Jun. 1, 2006, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

U.S. Publication No. US-2006-0067756-A1 filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Publication No. US-2006-0067757-A1, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. Application No. US-2006-0012102-A1, published Jan. 19, 2006, entitled "FLEXIBLE PAPER PATH USING MULTIDIRECTIONAL PATH MODULES," by Daniel G. Bobrow;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. Pat. No. 7,188,929, Issued Mar. 13, 2007, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. Pat. No. 7,924,152, issued Apr. 4, 2006, entitled "PRINTING SYSTEM WITH HORIZONTAL HIGHWAY AND SINGLE PASS DUPLEX," by Robert M. Lofthus, et al.;

U.S. Pat. No. 7,123,873, issued Oct. 17, 2006, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Publication No. US-2006-0039729-A1, published Feb. 23, 2006, entitled "PARALLEL PRINTING ARCHITECTURE USING IMAGE MARKING ENGINE MODULES (as amended)," by Barry P. Mandel, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. Pat. No. 7,162,172, Issued Jan. 9, 2007, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. Publication No. US-2006-0115287-A1, Published Jun. 1, 2006, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. Publication No. US-2006-0115288-A1, Published Jun. 1, 2006, entitled "GLOSSING SYSTEM FOR USE IN A TIPP ARCHITECTURE," by Bryan J. Roof;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. Publication No. US-2006-0176336-A1, Published Aug. 10, 2006, entitled "PRINTING SYSTEMS," by Steven R. Moore, et al.;

U.S. Publication No. US-2006-0132815-A1, Published Jun. 22, 2006, entitled "PRINTING SYSTEMS," by Robert M. Lofthus, et al.;

U.S. Publication No. US-2006-0197966-A1, Published Sep. 7, 2006, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. Publication No. US-2006-0209101-A1, Published Sep. 21, 2006, entitled "SYSTEMS AND METHODS FOR MEASURING UNIFORMITY IN IMAGES," by Howard Mizes;

U.S. Publication No. US-2006-0214364-A1, Published Sep. 28, 2006, entitled "SHEET REGISTRATION WITHIN A MEDIA INVERTER," by Robert A. Clark, et al.;

U.S. Publication No. US-2006-0214359-A1, Published Sep. 28, 2006, entitled "INVERTER WITH RETURN/BYPASS PAPER PATH," by Robert A. Clark;

U.S. Publication No. 20031468-US-NP, Published Sep. 28, 2006, entitled IMAGE QUALITY CONTROL METHOD AND APPARATUS FOR MULTIPLE MARKING ENGINE SYSTEMS," by Michael C. Mongeon;

U.S. Publication No. US-2006-0222378-A1, Published Oct. 5, 2006, entitled "PRINTING SYSTEM," by Paul C. Julien;

U.S. Publication No. US-2006-0221362-A1, Published Oct. 5, 2006, entitled "PRINTING SYSTEM," by Paul C. Julien;

U.S. Publication No. US-2006-0222393-A1, Published Oct. 5, 2006, entitled "PRINTING SYSTEM," by Jeremy C. dejong, et al.;

U.S. Publication No. US-2006-0222384-A1, Published Oct. 5, 2006, entitled "IMAGE ON PAPER REGISTRATION ALIGNMENT," by Steven R. Moore, et al.;

U.S. Publication No. US-2006-0221159-A1, Published Oct. 5, 2006, entitled "PARALLEL PRINTING ARCHITECTURE WITH PARALLEL HORIZONTAL PRINTING MODULES," by Steven R. Moore, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P. J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. Publication No. US-2006-0233569-A1, filed Oct. 19, 2006, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. Publication No. US-2006-0238778-A1, Published Oct. 26, 2006, entitled "PRINTING SYSTEMS," by Michael C. Mongeon, et al.;

U.S. Publication No. US-2006-0244980-A1, Filed Apr. 27, 2005, entitled "IMAGE QUALITY ADJUSTMENT METHOD AND SYSTEM," by Robert E. Grace;

U.S. Publication No. US-2006-0250636-A1, published Nov. 9, 2006, entitled "PRINTING SYSTEM AND SCHEDULING METHOD," by Austin L. Richards;

U.S. Publication No. US-2006-0269310-A1, Published Nov. 30, 2006, entitled "PRINTING SYSTEMS," by Kristine A. German, et al.;

U.S. Publication No. US-2006-0268318-A1, Published Nov. 30, 2006, entitled "PRINTING SYSTEM," by Robert M. Lofthus, et al.;

U.S. Publication No. US-2006-0268317-A1, Published Nov. 30, 2006, entitled "SCHEDULING SYSTEM," by Robert M. Lofthus, et al.;

U.S. Publication No. US-2006-0066885-A1, filed May 25, 2005, entitled "PRINTING SYSTEM," by David G. Anderson, et al.;

U.S. Publication No. US-2006-0274337-A1, Published Dec. 7, 2006, entitled "INTER-SEPARATION DECORRELATOR," by Edul N. Dalal, et al.;

U.S. Publication No. US-2006-0274334-A1, Published Dec. 7, 2006, entitled "LOW COST ADJUSTMENT METHOD FOR PRINTING SYSTEMS," by Michael C. Mongeon;

U.S. Publication No. US-2006-0280517-A1, Published Dec. 14, 206, entitled "WARM-UP OF MULTIPLE INTEGRATED MARKING ENGINES," by Bryan J. Roof, et al.;

U.S. Publication No. US-2006-0285857-A1, Published Dec. 21, 2006, entitled "PRINTING PLATFORM," by Joseph A. Swift;

U.S. Publication No. US-2006-0285159-A1, Published Dec. 21, 2006, entitled "METHOD OF ORDERING JOB QUEUE OF MARKING SYSTEMS," by Neil A. Frankel;

U.S. Publication No. US-2006-0291927-A1, Published Dec. 28, 2006, entitled "GLOSSING SUBSYSTEM FOR A PRINTING DEVICE," by Bryan J. Roof, et al.;

U.S. Publication No. US-2006-0291018-A1, Published Dec. 28, 2006, entitled "MIXED OUTPUT PRINT CONTROL METHOD AND SYSTEM," by Joseph H. Lang, et al.;

U.S. application Ser. No. 11/166,299, filed Jun. 24, 2005, entitled "PRINTING SYSTEM," by Steven R. Moore;

U.S. Publication No. US-2007-0002403-A1, Published Jan. 4, 2007, entitled "METHOD AND SYSTEM FOR PROCESSING SCANNED PATCHES FOR USE IN IMAGING DEVICE CALIBRATION," by R. Victor Klassen;

U.S. Publication No. US-2007-0002344-A1, Published Jan. 4, 2007, entitled "COLOR CHARACTERIZATION OR CALIBRATION TARGETS WITH NOISE-DEPENDENT PATCH SIZE OR NUMBER," by R. Victor Klassen;

U.S. Publication No. US-2007-0002085-A1, Published Jan. 4, 2007 entitled "HIGH AVAILABILITY PRINTING SYSTEMS," by Meera Sampath, et al.;

U.S. Publication No. US-2007-0024894-A1, Published Feb. 1, 2007, entitled "PRINTING SYSTEM," by Steven R. Moore, et al.;

U.S. Publication No. US-2007-0041745-A1, Published Feb. 22, 2007, entitled "MODULAR MARKING ARCHITECTURE FOR WIDE MEDIA PRINTING PLATFORM," by Edul N. Dalal, et al.;

U.S. application Ser. No. 11/215,791, filed Aug. 30, 2005, entitled "CONSUMABLE SELECTION IN A PRINTING SYSTEM," by Eric Hamby, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS," by Goodman, et al.;

U.S. application Ser. No. 11/234,553, filed Sep. 23, 2005, entitled "MAXIMUM GAMUT STRATEGY FOR THE PRINTING SYSTEMS," by Michael C. Mongeon;

U.S. application Ser. No. 11/234,468, filed Sep. 23, 2005, entitled "PRINTING SYSTEM," by Eric Hamby, et al.;

U.S. application Ser. No. 11/247,778, filed Oct. 11, 2005, entitled "PRINTING SYSTEM WITH BALANCED CONSUMABLE USAGE," by Charles Radulski, et al.;

U.S. application Ser. No. 11/248,044, filed Oct. 12, 2005, entitled "MEDIA PATH CROSSOVER FOR PRINTING SYSTEM," by Stan A. Spencer, et al.; and U.S. application Ser. No. 11/274,638, filed Nov. 15, 2005, entitled "GAMUT SELECTION IN MULTI-ENGINE SYSTEMS," by Wencheng Wu, et al.;

U.S. application Ser. No. 11/287,177, filed Nov. 23, 2005, entitled "MEDIA PASS THROUGH MODE FOR MULTI-ENGINE SYSTEM," by Barry P. Mandel, et al.;

U.S. application Ser. No. 11/287,685, filed Nov. 28, 2005, entitled "MULTIPLE IOT PPHOTORECEPTOR BELT SEAM SYNCHRONIZATION," by Kevin M. Carolan;

U.S. application Ser. No. 11/291,860, filed Nov. 30, 2005, entitled "MEDIA PATH CROSSOVER CLEARANCE FOR PRINTING SYSTEM," by Keith L. Willis;

U.S. application Ser. No. 11/292,388, filed Nov. 30, 2005, entitled "PRINTING SYSTEM," by David A. Mueller;

U.S. application Ser. No. 11/292,163, filed Nov. 30, 2005, entitled "RADIAL MERGE MODULE FOR PRINTING SYSTEM," by Barry P. Mandel, et al.;

U.S. application Ser. No. 11/291,583, filed Nov. 30, 2005, entitled "MIXED OUTPUT PRINTING SYSTEM," by Joseph H. Lang;

U.S. application Ser. No. 11/312,081, filed Dec. 20, 2005, entitled "PRINTING SYSTEM ARCHITECTURE WITH CENTER CROSS-OVER AND INTERPOSER BY-PASS PATH," by Barry P. Mandel, et al.;

U.S. application Ser. No. 11/314,828, filed Dec. 21, 2005, entitled "MEDIA PATH DIAGNOSTICS WITH HYPER MODULE ELEMENTS," by David G. Anderson, et al;

U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen;

U.S. application Ser. No. 11/317,589, filed Dec. 23, 2005, entitled "UNIVERSAL VARIABLE PITCH INTERFACE INTERCONNECTING FIXED PITCH SHEET PROCESSING MACHINES," by David K. Biegelsen, et al.;

U.S. application Ser. No. 11/317,167, filed Dec. 23, 2005, entitled "PRINTING SYSTEM," by Robert M. Lofthus, et al.; U.S. application Ser. No. 11/331,627, filed Jan. 13, 2006, entitled "PRINTING SYSTEM INVERTER APPARATUS", by Steven R. Moore;

U.S. application Ser. No. 11/341,733, filed Jan. 27, 2006, entitled "PRINTING SYSTEM AND BOTTLENECK OBVIATION", by Kristine A. German;

U.S. application Ser. No. 11/349,828, filed Feb. 8, 2005, entitled "MULTI-DEVELOPMENT SYSTEM PRINT ENGINE", by Martin E. Banton;

U.S. application Ser. No. 11/359,065, filed Feb. 22, 2005, entitled "MULTI-MARKING ENGINE PRINTING PLATFORM", by Martin E. Banton;

U.S. application Ser. No. 11/363,378, filed Feb. 27, 2006, entitled "SYSTEM FOR MASKING PRINT DEFECTS", by Anderson, et al.;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.;

U.S. application Ser. No. 11/399,100, filed Apr. 6, 2006, entitled "SYSTEMS AND METHODS TO MEASURE BANDING PRINT DEFECTS", by Peter Paul;

U.S. application Ser. No. 11/403,785, filed Apr. 13, 2006, entitled "MARKING ENGINE SELECTION", by Martin E. Banton et al.;

U.S. application Ser. No. 11/417,411, filed May 4, 2006, entitled "DIVERTER ASSEMBLY, PRINTING SYSTEM AND METHOD", by Paul J. Degruchy;

U.S. application Ser. No. 11/432,993, filed May 12, 2006, entitled "TONER SUPPLY ARRANGEMENT", by David G. Anderson;

U.S. application Ser. No. 11/432,924, filed May 12, 2006, entitled "AUTOMATIC IMAGE QUALITY CONTROL OF MARKING PROCESSES", by David J. Lieberman;

U.S. application Ser. No. 11/432,905, filed May 12, 2006, entitled "PROCESS CONTROLS METHODS AND APPARATUSES FOR IMPROVED IMAGE CONSISTENCY", by Michael C. Mongeon et al.;

U.S. application Ser. No. 11/474,247, filed Jun. 23, 2006, entitled "CONTINUOUS FEED PRINTING SYSTEM", by Steven R. Moore;

U.S. application Ser. No. 11/483,747, filed Jul. 6, 2006, entitled "POWER REGULATOR OF MULTIPLE MARKING ENGINES", by Murray O. Meetze, Jr.;

U.S. application Ser. No. 11/485,870, filed Jul. 13, 2006, entitled "PARALLEL PRINTING SYSTEM", by Steven R. Moore;

U.S. application Ser. No. 11/487,206, filed Jul. 14, 2006, entitled "BANDING AND STREAK DETECTION USING CUSTOMER DOCUMENTS", by Wencheng Wu, et al.;

U.S. application Ser. No. 11/495,017, filed Jul. 28, 2006, entitled "SYSTEM AND METHOD FOR PARTIAL JOB INTERRUPT OF NORMAL ORDER OF JOB QUEUE OF MARKING SYSTEMS", by Lloyd F. Bean, II;

U.S. application Ser. No. 11/501,654, filed Aug. 9, 2006, entitled "METHOD FOR SPATIAL COLOR CALIBRATION USING HYBRID SENSING SYSTEMS", by Lalit Keshav Mestha et al.;

U.S. application Ser. No. 11/522,171, filed Sep. 15, 2006, entitled "FAULT MANAGEMENT FOR A PRINTING SYSTEM", by Meera Sampath, et al.;

U.S. application Ser. No. 11/528,770, filed Sep. 27, 2006, entitled "SHEET BUFFERING SYSTEM", by Paul DeGruchy;

U.S. Publication No. A3190-US-NP, Published Feb. 8, 2007, entitled "PRINTING SYSTEM WITH INVERTER DISPOSED FOR MEDIA VELOCITY BUFFERING AND REGISTRATION", by Joannes N. M. Dejong et al.

U.S. application Ser. No. 11/590,432, filed Oct. 31, 2006, entitled "SHAFT DRIVING APPARATUS", by Steven R. Moore;

U.S. application Ser. No. 11/595,630, filed Nov. 9, 2006, entitled "PRINT MEDIA ROTARY TRANSPORT APPARATUS AND METHOD", by Steven R. Moore;

U.S. application Ser. No. 11/636,901, filed Dec. 11, 2006, entitled "DATA BINDING IN MULTIPLE MARKING ENGINE PRINTING SYSTEMS BACKGROUND", by Martin E. Banton et al.;

U.S. application Ser. No. 11/636,747, filed Dec. 11, 2006, entitled "METHOD AND SYSTEM FOR IDENTIFYING OPTIMAL MEDIA FOR CALIBRATION AND CONTROL", by Lalit Keshav Mestha et al.; U.S. application Ser. No. 11/639,073, filed Dec. 14, 2006, entitled "MODULE IDENTIFICATION METHOD AND SYSTEM FOR PATH CONNECTIVITY IN MODULAR SYSTEMS", by David K. Biegelsen et al.;

U.S. application Ser. No. 11/612,908, filed Dec. 19, 2006, now U.S. Pat. No. 8,145,335, issued Mar. 27, 2012, entitled "EXCEPTION HANDLING", by Wheller Ruml et al.;

U.S. application Ser. No. 11/642,028, filed Dec. 19, 2006, entitled "BI-DIRECTIONAL MEDIA SHEET TRANSPORT APPARATUS", by James J. Spence et al.;

U.S. application Ser. No. 11/643,119, filed Dec. 21, 2006, entitled "MEDIA FEEDER FEED RATE", by Robert A. Clark et al.; U.S. application Ser. No. 11/656,992, filed Jan. 23, 2007, entitled "PREEMPTIVE REDIRECTION IN PRINTING SYSTEMS", by Meera Sampath et al.;

U.S. application Ser. No. 11/708,298, filed Feb. 20, 2007, entitled "EFFICIENT CROSS-STREAM PRINTING SYSTEM", by Joseph H. Lang;

U.S. application Ser. No. 11/656,992, filed Jan. 23, 2007, entitled "PREEMPTIVE REDIRECTION IN PRINTING SYSTEMS", by Meera Sampath et al.

The following patents/applications, the disclosures of each being totally incorporated herein by reference are mentioned:

U.S. Publication No. US-2006-0114497-A1, Published Jun. 1, 2006, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

U.S. Publication. No. US-2006-0067756-A1, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Publication No. US-2006-0067757-A1, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.; U.S. Application No. US-2006-0012102-A1, published Jan. 19, 2006, entitled "FLEXIBLE PAPER PATH USING MULTIDIRECTIONAL PATH MODULES," by Daniel G. Bobrow;

U.S. Pat. No. 7,206,532, Issued Apr. 17, 2007, entitled "MULTIPLE OBJECT SOURCES CONTROLLED AND/OR SELECTED BASED ON A COMMON SENSOR," by Robert M. Lofthus, et al.;

U.S. Pat. No. 7,188,929, Issued Mar. 13, 2007, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. Pat. No. 7,924,152, issued Apr. 4, 2006, entitled "PRINTING SYSTEM WITH HORIZONTAL HIGHWAY AND SINGLE PASS DUPLEX," by Robert M. Lofthus, et al.;

U.S. Pat. No. 7,123,873, issued Oct. 17, 2006, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Publication No. US-2006-0039729-A1, published Feb. 23, 2006, entitled "PARALLEL PRINTING ARCHITECTURE USING IMAGE MARKING ENGINE MODULES (as amended)," by Barry P. Mandel, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. Pat. No. 7,162,172, Issued Jan. 9, 2007, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. Publication No. US-2006-0115287-A1, Published Jun. 1, 2006, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. Publication No. US-2006-0115288-A1, Published Jun. 1, 2006, entitled "GLOSSING SYSTEM FOR USE IN A TIPP ARCHITECTURE," by Bryan J. Roof;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. Publication No. US-2006-0176336-A1, Published Aug. 10, 2006, entitled "PRINTING SYSTEMS," by Steven R. Moore, et al.;

U.S. Publication No. US-2006-0132815-A1, Published Jun. 22, 2006, entitled "PRINTING SYSTEMS," by Robert M. Lofthus, et al.;

U.S. Publication No. US-2006-0197966-A1, Published Sep. 7, 2006, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. Publication No. US-2006-0209101-A1, Published Sep. 21, 2006, entitled "SYSTEMS AND METHODS FOR MEASURING UNIFORMITY IN IMAGES," by Howard Mizes;

U.S. Publication No. US-2006-0214364-A1, Published Sep. 28, 2006, entitled "SHEET REGISTRATION WITHIN A MEDIA INVERTER," by Robert A. Clark, et al.;

U.S. Publication No. US-2006-0214359-A1, Published Sep. 28, 2006, entitled "INVERTER WITH RETURN/BYPASS PAPER PATH," by Robert A. Clark;

U.S. Publication No. 20031468-US-NP, Published Sep. 28, 2006, entitled IMAGE QUALITY CONTROL METHOD AND APPARATUS FOR MULTIPLE MARKING ENGINE SYSTEMS," by Michael C. Mongeon;

U.S. Pat. No. 7,206,536, Issued Apr. 17, 2007, entitled "PRINTING SYSTEM," by Paul C. Julien; U.S. Publication No. US-2006-0221362-A1, Published Oct. 5, 2006, entitled "PRINTING SYSTEM," by Paul C. Julien;

U.S. Publication No. US-2006-0222393-A1, Published Oct. 5, 2006, entitled "PRINTING SYSTEM," by Jeremy C. dejong, et al.;

U.S. Publication No. US-2006-0222384-A1, Published Oct. 5, 2006, entitled "IMAGE ON PAPER REGISTRATION ALIGNMENT," by Steven R. Moore, et al.;

U.S. Publication No. US-2006-0221159-A1, Published Oct. 5, 2006, entitled "PARALLEL PRINTING ARCHITECTURE WITH PARALLEL HORIZONTAL PRINTING MODULES," by Steven R. Moore, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P. J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. Publication No. US-2006-0233569-A1, filed Oct. 19, 2006, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. Publication No. US-2006-0238778-A1, Published Oct. 26, 2006, entitled "PRINTING SYSTEMS," by Michael C. Mongeon, et al.;

U.S. Publication No. US-2006-0244980-A1, Filed Apr. 27, 2005, entitled "IMAGE QUALITY ADJUSTMENT METHOD AND SYSTEM," by Robert E. Grace;

U.S. Publication No. US-2006-0250636-A1, published Nov. 9, 2006, entitled "PRINTING SYSTEM AND SCHEDULING METHOD," by Austin L. Richards;

U.S. Publication No. US-2006-0269310-A1, Published Nov. 30, 2006, entitled "PRINTING SYSTEMS," by Kristine A. German, et al.;

U.S. Publication No. US-2006-0268318-A1, Published Nov. 30, 2006, entitled "PRINTING SYSTEM," by Robert M. Lofthus, et al.;

U.S. Publication No. US-2006-0268317-A1, Published Nov. 30, 2006, entitled "SCHEDULING SYSTEM," by Robert M. Lofthus, et al.;

U.S. Publication No. US-2006-0066885-A1, filed May 25, 2005, entitled "PRINTING SYSTEM," by David G. Anderson, et al.;

U.S. Publication No. US-2006-0274337-A1, Published Dec. 7, 2006, entitled "INTER-SEPARATION DECORRELATOR," by Edul N. Dalal, et al.;

U.S. Publication No. US-2006-0274334-A1, Published Dec. 7, 2006, entitled "LOW COST ADJUSTMENT METHOD FOR PRINTING SYSTEMS," by Michael C. Mongeon;

U.S. Publication No. US-2006-0280517-A1, Published Dec. 14, 2006, entitled "WARM-UP OF MULTIPLE INTEGRATED MARKING ENGINES," by Bryan J. Roof, et al.;

U.S. Publication No. US-2006-0285857-A1, Published Dec. 21, 2006, entitled "PRINTING PLATFORM," by Joseph A. Swift;

U.S. Publication No. US-2006-0285159-A1, Published Dec. 21, 2006, entitled "METHOD OF ORDERING JOB QUEUE OF MARKING SYSTEMS," by Neil A. Frankel;

U.S. Publication No. US-2006-0291927-A1, Published Dec. 28, 2006, entitled "GLOSSING SUBSYSTEM FOR A PRINTING DEVICE," by Bryan J. Roof, et al.;

U.S. Publication No. US-2006-0291018-A1, Published Dec. 28, 2006, entitled "MIXED OUTPUT PRINT CONTROL METHOD AND SYSTEM," by Joseph H. Lang, et al.;

U.S. application Ser. No. 11/166,299, filed Jun. 24, 2005, entitled "PRINTING SYSTEM," by Steven R. Moore;

U.S. Publication No. US-2007-0002403-A1, Published Jan. 4, 2007, entitled "METHOD AND SYSTEM FOR PROCESSING SCANNED PATCHES FOR USE IN IMAGING DEVICE CALIBRATION," by R. Victor Klassen;

U.S. Publication No. US-2007-0002344-A1, Published Jan. 4, 2007, entitled "COLOR CHARACTERIZATION OR CALIBRATION TARGETS WITH NOISE-DEPENDENT PATCH SIZE OR NUMBER," by R. Victor Klassen;

U.S. Publication No. US-2007-0002085-A1, Published Jan. 4, 2007 entitled "HIGH AVAILABILITY PRINTING SYSTEMS," by Meera Sampath, et al.;

U.S. Publication No. US-2007-0024894-A1, Published Feb. 1, 2007, entitled "PRINTING SYSTEM," by Steven R. Moore, et al.;

U.S. Publication No. US-2007-0041745-A1, Published Feb. 22, 2007, entitled "MODULAR MARKING ARCHITECTURE FOR WIDE MEDIA PRINTING PLATFORM," by Edul N. Dalal, et al.;

U.S. application Ser. No. 11/215,791, filed Aug. 30, 2005, entitled "CONSUMABLE SELECTION IN A PRINTING SYSTEM," by Eric Hamby, et al.;

U.S. Application Publication. No. US-2007-0052991-A1, Published Mar. 8, 2007, entitled "METHOD AND SYSTEMS FOR DETERMINING BANDING COMPENSATION PARAMETERS IN PRINTING SYSTEMS," by Goodman, et al.;

U.S. application Ser. No. 11/234,553, filed Sep. 23, 2005, entitled "MAXIMUM GAMUT STRATEGY FOR THE PRINTING SYSTEMS," by Michael C. Mongeon;

U.S. application Ser. No. 11/234,468, filed Sep. 23, 2005, entitled "PRINTING SYSTEM," by Eric Hamby, et al.;

U.S. application Ser. No. 11/247,778, filed Oct. 11, 2005, entitled "PRINTING SYSTEM WITH BALANCED CONSUMABLE USAGE," by Charles Radulski, et al.;

U.S. application Ser. No. 11/248,044, filed Oct. 12, 2005, entitled "MEDIA PATH CROSSOVER FOR PRINTING SYSTEM," by Stan A. Spencer, et al.; and U.S. application Ser. No. 11/274,638, filed Nov. 15, 2005, entitled "GAMUT SELECTION IN MULTI-ENGINE SYSTEMS," by Wencheng Wu, et al.;

U.S. application Ser. No. 11/287,177, filed Nov. 23, 2005, entitled "MEDIA PASS THROUGH MODE FOR MULTI-ENGINE SYSTEM," by Barry P. Mandel, et al.;

U.S. application Ser. No. 11/287,685, filed Nov. 28, 2005, entitled "MULTIPLE IOT PPHOTORECEPTOR BELT SEAM SYNCHRONIZATION," by Kevin M. Carolan;

U.S. application Ser. No. 11/291,860, filed Nov. 30, 2005, entitled "MEDIA PATH CROSSOVER CLEARANCE FOR PRINTING SYSTEM," by Keith L. Willis;

U.S. application Ser. No. 11/292,388, filed Nov. 30, 2005, entitled "PRINTING SYSTEM," by David A. Mueller;

U.S. application Ser. No. 11/292,163, filed Nov. 30, 2005, entitled "RADIAL MERGE MODULE FOR PRINTING SYSTEM," by Barry P. Mandel, et al.;

U.S. application Ser. No. 11/291,583, filed Nov. 30, 2005, entitled "MIXED OUTPUT PRINTING SYSTEM," by Joseph H. Lang;

U.S. application Ser. No. 11/312,081, filed Dec. 20, 2005, entitled "PRINTING SYSTEM ARCHITECTURE WITH CENTER CROSS-OVER AND INTERPOSER BY-PASS PATH," by Barry P. Mandel, et al.;

U.S. application Ser. No. 11/314,828, filed Dec. 21, 2005, entitled "MEDIA PATH DIAGNOSTICS WITH HYPER MODULE ELEMENTS," by David G. Anderson, et al;

U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen;

U.S. application Ser. No. 11/317,589, filed Dec. 23, 2005, entitled "UNIVERSAL VARIABLE PITCH INTERFACE INTERCONNECTING FIXED PITCH SHEET PROCESSING MACHINES," by David K. Biegelsen, et al.;

U.S. application Ser. No. 11/317,167, filed Dec. 23, 2005, entitled "PRINTING SYSTEM," by Robert M. Lofthus, et al.;

U.S. application Ser. No. 11/331,627, filed Jan. 13, 2006, entitled "PRINTING SYSTEM INVERTER APPARATUS", by Steven R. Moore;

U.S. application Ser. No. 11/341,733, filed Jan. 27, 2006, entitled "PRINTING SYSTEM AND BOTTLENECK OBVIATION", by Kristine A. German;

U.S. application Ser. No. 11/349,828, filed Feb. 8, 2005, entitled "MULTI-DEVELOPMENT SYSTEM PRINT ENGINE", by Martin E. Banton;

U.S. application Ser. No. 11/359,065, filed Feb. 22, 2005, entitled "MULTI-MARKING ENGINE PRINTING PLATFORM", by Martin E. Banton;

U.S. application Ser. No. 11/363,378, filed Feb. 27, 2006, entitled "SYSTEM FOR MASKING PRINT DEFECTS", by Anderson, et al.;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.;

U.S. application Ser. No. 11/399,100, filed Apr. 6, 2006, entitled "SYSTEMS AND METHODS TO MEASURE BANDING PRINT DEFECTS", by Peter Paul;

U.S. application Ser. No. 11/403,785, filed Apr. 13, 2006, entitled "MARKING ENGINE SELECTION", by Martin E. Banton et al.;

U.S. application Ser. No. 11/417,411, filed May 4, 2006, entitled "DIVERTER ASSEMBLY, PRINTING SYSTEM AND METHOD", by Paul J. Degruchy;

U.S. application Ser. No. 11/432,993, filed May 12, 2006, entitled "TONER SUPPLY ARRANGEMENT", by David G. Anderson;

U.S. application Ser. No. 11/432,924; filed May 12, 2006, entitled "AUTOMATIC IMAGE QUALITY CONTROL OF MARKING PROCESSES", by David J. Lieberman;

U.S. application Ser. No. 11/432,905, filed May 12, 2006, entitled "PROCESS CONTROLS METHODS AND APPARATUSES FOR IMPROVED IMAGE CONSISTENCY", by Michael C. Mongeon et al.;

U.S. application Ser. No. 11/474,247, filed Jun. 23, 2006, entitled "CONTINUOUS FEED PRINTING SYSTEM", by Steven R. Moore;

U.S. application Ser. No. 11/483,747, filed Jul. 6, 2006, entitled "POWER REGULATOR OF MULTIPLE MARKING ENGINES", by Murray O. Meetze, Jr.;

U.S. application Ser. No. 11/485,870, filed Jul. 13, 2006, entitled "PARALLEL PRINTING SYSTEM", by Steven R. Moore;

U.S. application Ser. No. 11/487,206, filed Jul. 14, 2006, entitled "BANDING AND STREAK DETECTION USING CUSTOMER DOCUMENTS", by Wencheng Wu, et al.;

U.S. application Ser. No. 11/495,017, filed Jul. 28, 2006, entitled "SYSTEM AND METHOD FOR PARTIAL JOB INTERRUPT OF NORMAL ORDER OF JOB QUEUE OF MARKING SYSTEMS", by Lloyd P. Bean, II;

U.S. application Ser. No. 11/501,654, filed Aug. 9, 2006, entitled "METHOD FOR SPATIAL COLOR CALIBRATION USING HYBRID SENSING SYSTEMS", by Lalit Keshav Mestha et al.;

U.S. application Ser. No. 11/522,171, filed Sep. 15, 2006, entitled "FAULT MANAGEMENT FOR A PRINTING SYSTEM", by Meera Sampath, et al.;

U.S. application Ser. No. 11/528,770, filed Sep. 27, 2006, entitled "SHEET BUFFERING SYSTEM", by Paul DeGruchy;

U.S. application Ser. No. 11/545,176, filed Oct. 10, 2006, now U.S. Pat. No. 7,421,241, issued Sep. 2, 2008, entitled "PRINTING SYSTEM WITH INVERTER DISPOSED FOR MEDIA VELOCITY I3UFFERING AND REGISTRATION", by Joannes N. M. Dejong et al.;

U.S. application Ser. No. 11/590,432, filed Oct. 31, 2006, entitled "SHAFT DRIVING APPARATUS", by Steven R. Moore;

U.S. application Ser. No. 11/595,630, filed Nov. 9, 2006, entitled "PRINT MEDIA ROTARY TRANSPORT APPARATUS AND METHOD", by Steven R. Moore;

U.S. application Ser. No. 11/636,901, filed Dec. 11, 2006, entitled "DATA BINDING IN MULTIPLE MARKING ENGINE PRINTING SYSTEMS BACKGROUND", by Martin E. Banton et al.;

U.S. application Ser. No. 11/636,747, filed Dec. 11, 2006, entitled "METHOD AND SYSTEM FOR IDENTIFYING OPTIMAL MEDIA FOR CALIBRATION AND CONTROL", by Lalit Keshav Mestha et al.;

U.S. application Ser. No. 11/639,073, filed Dec. 14, 2006, entitled "MODULE IDENTIFICATION METHOD AND SYSTEM FOR PATH CONNECTIVITY IN MODULAR SYSTEMS", by David K. Biegelsen et al.;

U.S. application Ser. No. 11/642,028, filed Dec. 19, 2006, entitled "BI-DIRECTIONAL MEDIA SHEET TRANSPORT APPARATUS", by James J. Spence et al.;

U.S. application Ser. No. 11/643,119, filed Dec. 21, 2006, entitled "MEDIA FEEDER FEED RATE", by Robert A. Clark et al.;

U.S. application Ser. No. 11/656,992, filed Jan. 23, 2007, entitled "PREEMPTIVE REDIRECTION IN PRINTING SYSTEMS", by Meera Sampath et al.;

U.S. application Ser. No. 11/708,298, filed Feb. 20, 2007, entitled "EFFICIENT CROSS-STREAM PRINTING SYSTEM", by Joseph H. Lang;

U.S. application Ser. No. 11/714,016, filed Mar. 5, 2007, entitled "METHOD OF DUPLEX PRINTING ON SHEET MEDIA", by Michael R. Furst;

U.S. application Ser. No. 11/787,777, filed Apr. 18, 2007, entitled "METHOD OF CONTROLLING AUTOMATIC ELECTROSTATIC MEDIA SHEET PRINTING", by Daniel W. Costanza et al.,

BRIEF DESCRIPTION

According to an aspect illustrated herein, a printing system can comprise a plurality of print processing modules which selectively transfer print media therebetween during printing and a system controller that tracks process control protocols of each of the plurality of modules and compares to a scheduled job run and selectively alters a control variable of at least one of the process control protocols thereby preemptively altering initiation of at least one process control protocol to process the job run uninterrupted.

According to another aspect illustrated herein, a method for predicting the impending off-line state of one or more modules of a printing system having a plurality of modules can comprise a system controller that tracks process control protocols of each one of the plurality of modules and compares to a scheduled job run and selectively alters a control variable of at least one of the process control protocols thereby preemptively altering initiation of at least one process control protocol to process the job run uninterrupted. The method can further comprise rescheduling one of an unprocessed job and a partially processed job preemptively based on the altered initiation of at least one process control protocol to process unprocessed portions of the job. The altering initiation of at least one process control protocol can be selectively either before or after reaching one or more predetermined threshold limit. The system can track and trend control variable data and compare the data to predetermined threshold limits to predict the impending process control protocol of at least one module. The control variable data can be selected from the group consisting of one or more of print counters, error counters, parts usage counters, sensors, process loop actuators, service history and user input associated with the plurality of modules.

According to still another aspect illustrated herein, a method for scheduling jobs in a printing system with multiple marking engines and multiple print media components can comprise a system controller predicting an impending process control protocol taking a marking engine off-line. The system controller can track the impending off-line state wherein the system controller tracks and trends control variable data selected from the group consisting of one or more of print counters, error counters, parts usage counters, sensors, process loop actuators, service history and user input associated with the plurality of modules, and compares the data to predetermined threshold limits to selectively override the impending process control protocol of at least one module. Overriding the process control protocol can further comprise individual image marking engine self diagnostics and comparisons of the resulting diagnostic data to predetermined threshold limits. The system controller can resume the process control protocol after a job run has terminated.

DETAILED DESCRIPTION

In integrated printing systems it is desirable for the individual image marking engines (IMEs) to produce printed sheets in a predictable and temporally deterministic manner, to maximize throughput and minimize purged sheets due to sheets which, for various reasons, are inappropriately produced out of order. In one scenario, the IME software and process controls would be specifically developed in such a way as to provide the desired level of predictability.

Predictability can be defined as deterministically printing at predetermined times consistent with the overall system page scheduling. In the case where IME's that do not exhibit the desired level of predictability are used, due to availability and economic factors, these IME's would produce an unacceptable number of purged, out of order sheets due to interruptions in the system printing schedule. These interruptions are caused by any single IME in the system unpredictably going offline, for example to process control protocols, perform print quality, and/or maintenance functions while the other IMEs in the system continue to print. Heretofore, single IMEs could go off-line based on internal process control protocols without communicating this to, or requesting permission from, the system software, sheet scheduler, or controller.

IME process controls and maintenance functions can be triggered when internal counters reach stored limit values or thresholds. These limit values can be stored in the IME's non-volatile memory (NVM) which can be read and reset from the system controller 4. If the system controller 4 has access to the individual IME's NVM settings and a shadow copy of the counters, the system controller 4 will be able to not only predict, but also control when an IME will go offline.

Given that the system controller's job scheduling software can now be aware of if, when, and how long an IME will go offline, it can either choose to create a schedule that will accommodate the predicted printing interruption or update/alter the NVM trigger values to cause the impending interruption to happen at a time that will accommodate the job schedule.

Figure 1:
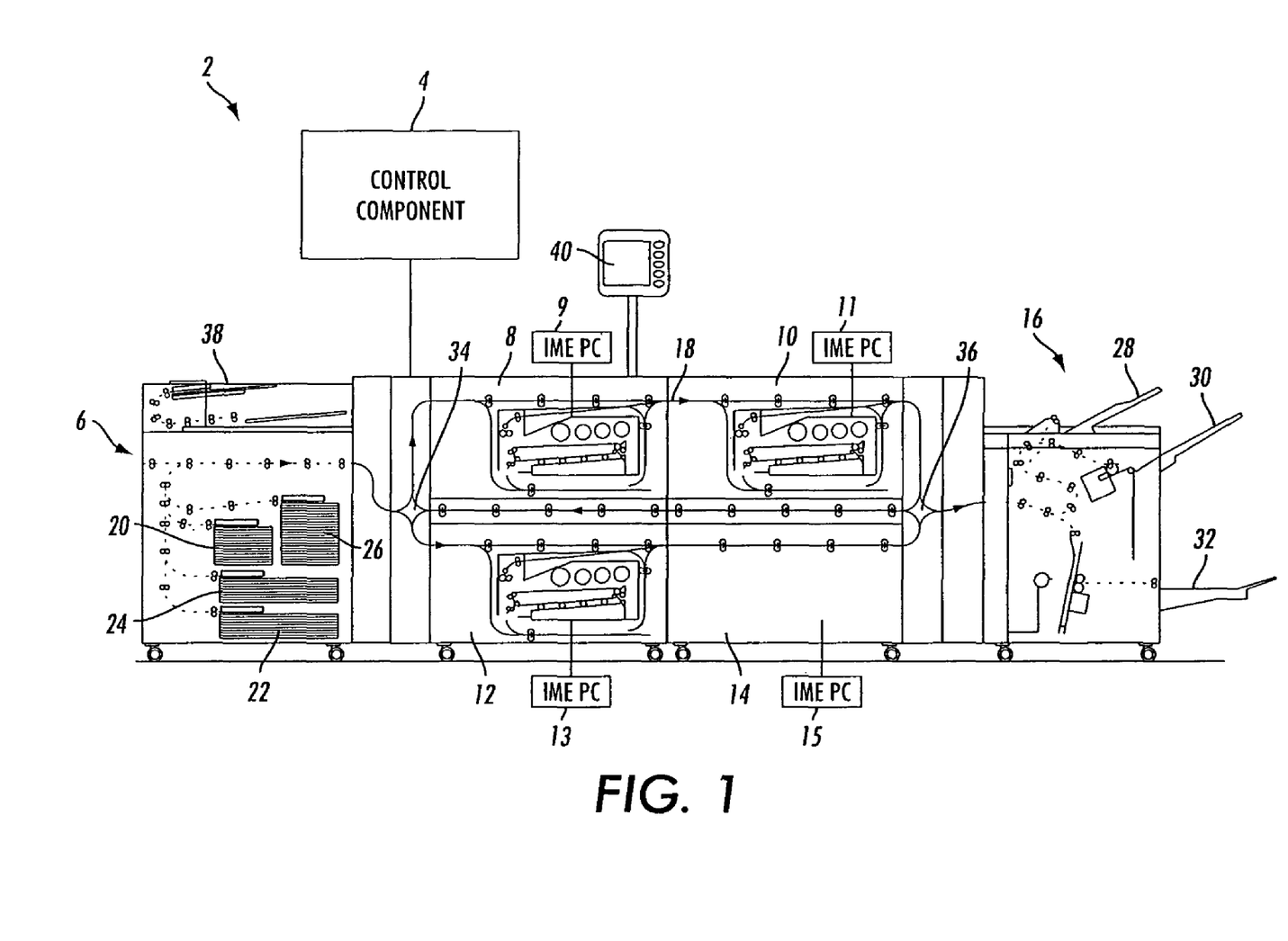
FIG. 1 illustrates an exemplary printing system having a plurality of system components that can alter the timing of, or reschedule, process control protocols anticipated for the system components; and, FIG. 2 illustrates exemplary printing system components for using a system controller and sheet scheduler to preemptively alter the schedule of at least a portion of a print job.

With reference to FIG. 1, a printing system 2 is illustrated. The printing system 2 includes a controller or control component 4 that controls the components of the printing system 2 and manages print jobs. For example, the control component 4 invokes component warm-up routines when power is cycled on or when the printing system 2 transitions from a lower power (e.g., a sleep) mode to a higher power (e.g., printing) mode. In another example, the control component 4 loads software, firmware, applications and the like. In another example, the control component 4 directs print jobs to one or more print engines 8, 10, 12, 14. In yet another example, the control component 4 can track and monitor the process control protocols or maintenance procedures 9, 11, 13, 15 of individual components of the printing system 2. Based on the process controls of the components 9, 11, 13, 15, the control component 4 continues controlling the system 2 with an existing control strategy or begins controlling the system 2 under a new control strategy. For instance, the control component 4 can anticipate a process control protocol of a component (e.g., a developer, a fuser, a transferor, a charger, a cleaner . . . ) which would render the component unavailable, and/or interrupt component processing, for an upcoming job run or during a current job run. The control component 4 may then manipulate or override one or more of the process control protocols including, for example, NVM trigger or threshold values, print counts, sensor signals, etc., in order to circumvent interruptions to unprocessed portions of the print job currently in progress, scheduled/queued jobs, and/or future jobs.

In one exemplary arrangement, the process control protocols 9, 11, 13, 15 can remain as programmed while the control component 4 manipulates a print count value thereby tampering with the threshold that causes a process control protocol to be triggered. In this manner, the process control protocols and related process codes are not altered, only the threshold or triggering values are manipulated. The individual IME manipulation occurs via alteration of, for example, NVM trigger values and counter values of the individual IMEs whereby the IMEs are not cognizant of the manipulation. It is to be appreciated that the process controls can be manipulated to run before or after reaching the unaltered or true (actual) counter thresholds.

In another exemplary arrangement, the control component 4 can maintain a hierarchy over the process controls 9, 11, 13, 15 whereby the control component 4 can override or condition the process controls and enable/disable the process control protocols. At the time one or more of the individual IME process controls 9, 11, 13, 15 are ready to run, the control component 4 can be accessed and selectively determine whether to run, delay, reschedule, and/or cancel the process control protocol.

If a process control cannot be advanced prior to a run job or delayed until after a run job, alternate redundant components in the printing system that possess similar capabilities as the component that is to be unavailable can be enlisted to run a job.

The methods outlined above, provides for the use and integration of IMEs from multiple sources without requiring a vendor to modify the IME software or process protocols, which reduces both product acquisition spending and time to market.

For a single IME or printer, responsibility for sheet scheduling and timing is divided between the system software and the IME software. The system software can be responsible for submitting the job such that the sheets will come out in the desired order. The IME control software can be responsible for controlling print and peripheral (feeder, finisher, scanner) timing to prevent sheet collisions and ensure that sheets are produced in the correct order. Because of this model, it is permissible for the IME to interrupt printing to perform process control and maintenance functions without communicating this to, or requesting permission from, the system software.

Due to the fact the integrated printing systems have two or more IMEs that have no control over each other, the system software must not only submit the print job in such a way as to ensure sheets are delivered in the correct order, but also specify the sheet timing within the printer to prevent collisions of sheets as they merge into and out of the IMEs, feeders, and finishers. Since the system software is now controlling both the order and timing of sheets, it must have prior knowledge of, or control over, any job interruptions from any single IME so that it can schedule and route sheets around the IME that is off-line to prevent collisions and maintain sheet order.

The method of giving the system scheduling software knowledge and control over job interruptions is to have the system software periodically read the relevant process control set points/variables and counters from the IMEs and use this data to predict when/if a job interruption will occur. The scheduler can then use these predictions to either modify the schedule to accommodate the interruptions, or update the process control set-points to change when the interruption will happen to accommodate the schedule. In the case where set points or counters are not directly readable by the system software from the IMEs, the system can keep a model to predict when the IME will go off-line for process controls or maintenance cycles.

Integrated print sheet schedulers can use the knowledge of machine capabilities which can describe actions that can be preformed on a sheet and the time that it takes to use the action. A schedule can be created by determining which actions are required to produce a sheet with the desired properties and the order in which the actions must be preformed. These actions and their respective durations can be linked together and stored in a temporal database which describes the time ordered events required to produce the requested print job. Given this model, it is easy to introduce new machine capabilities and their respective durations into the scheduler to describe the process control and maintenance functions in the IMEs. Given the ability to predict when the IMEs in the system will go off line, the scheduler can choose to either insert the required job interruption capability into the temporal database at the time that the IME wants to do it, and thus plan for the interruption, or determine the optimum time to do it and update or alter the IME's control variables or trigger values to make it happen at the optimum time.

Alternately, the control component 4 may predict when the impending component will be capable of performing at a reduced capacity and/or with reduced functionality. The control component 4 can accordingly adjust its control strategy to leverage the impending reduced set of capabilities and timing of the predicted component to at least partially process jobs. It is to be understood that the foregoing examples are provided for explanatory purposes and are not all-inclusive or limitative; the control component 4 can control more, less, similar and/or different operations of the printing system 2.

With reference again to FIG. 1, the control component 4 can control a plurality of processing units 6, 8, 10, 12, 14, 16 that are coupled through a print media conveyor. The processing units 6, 8, 10, 12, 14, 16 cooperate to process print jobs at a relatively high rate. While this example illustrates six processing units, it is to be understood that the printing system 2 can include N processing units, where N is an integer equal to or greater than one.

One or more of the processing units 6, 8, 10, 12, 14, 16 can be removable. For example, the functional portion (e.g., marking engine) of the processing unit 14 is absent from the printing system 2, leaving a housing or mounting fixture through which a print media conveyor or transport paper path 18 passes. In this manner, the functional portion of any of the processing units 6, 8, 10, 12, 14, 16 can be removed for repair or replaced to effectuate an upgrade, modification and/or repair of the printing system 2. The printing system 2 remains operational with the functional portion of the processing unit 14 removed, malfunctioning, faulty, broken, or otherwise unavailable, with some loss of the overall printing functionality.

Some or all of the processing units 8, 10, 12, 14 may be identical to provide redundancy or improved productivity through parallel printing. Alternatively or additionally, some or all of the processing units 8, 10, 12, 14 may be different to provide different capabilities. For example, the processing units 8 and 10 may include color marking engines, while the processing unit 12 includes a black (K) marking engine. Suitable marking engines include electrophotographic printers, ink-jet printers, including solid ink printers, thermal head printers that are used in conjunction with heat sensitive paper, and/or other devices capable of marking an image on a substrate. The marking engines may be of the same or different modalities (e.g., black (K), custom color (C), process color (P), or magnetic ink character recognition (MICR) (M)). In addition, the marking engines may be capable of generating more than one type of print modality, for example, black and process color.

In addition, the processing units 8, 10, 12, 14 can be stacked vertically and/or horizontally to form a tandem, parallel and/or cluster printer for simplex, duplex and/or multi-pass printing. The processing units 8, 10, 12, 14 can employ xerographic printing technology, in which an electrostatic image is formed and coated with a toner material, and then transferred and fused to paper or another print medium by application of heat and pressure. However, processing units employing other printing technologies can be employed as processing units, such as processing units employing ink jet transfer, thermal impact printing, or so forth.

Based on measurements such as the above, the controller 4 can employ various detection/prediction schemes to assess the state of components. Threshold checks on the sensors in the system, as well as time based checks can also be used to assess components. Actuator values can be compared to the established process control limits and significant deviations from normal, i.e. anticipated actuator values, both in magnitude and direction can provide a good indication of whether process control protocols can be postponed and/or rescheduled. Such assessment can include identifying how frequently the compensation schemes are being activated, how much compensation is provided (i.e., how much the actuator values deviate from nominal values), trends, and variations in the actuator signals.

Upon assessing component status, the control component 4 can preemptively determine whether the processing units 6, 8, 10, 12, 14, 16, or a portion thereof, will be able to continue processing jobs. For example, the processing unit may be moving closely toward a control limit threshold. The controller may then preemptively alter the associated NVM control limit count, i.e. lower the count, to postpone when the threshold is reached.

Thus, an impending process control protocol for a component may be delayed for certain jobs for a period without limitation. Therefore, whenever the process control protocol is of a nature that will render loss of some capabilities or reduced performance, the component can be assessed to determine whether delaying the process control protocol will compromise the performance of the component.

It is to be appreciated that altering process control protocols can be through various techniques such as automatic (without human assistance and/or intervention), manual (human invoked), and/or a combination thereof (e.g., where the controller determines a process control protocol can be rescheduled and the human initiates the rescheduling).

The processing unit 6 can be a print media source processing unit that supplies printing media substrate for printing, and the processing unit 16 can be a finisher that provides finishing capabilities such as collation, stapling, folding, stacking, hole-punching, binding, postage stamping, or so forth. The print media source processing unit 6 can include print media sources 20, 22, 24 and 26 connected with the print media conveyor 18 to provide selected types of print media. While four print media sources are illustrated, K print media sources can be employed, wherein K is an integer equal to or greater than one. Moreover, while the illustrated print media sources 20, 22, 24, 26 are embodied as components of the dedicated print media source processing unit 6, in other instances one or more of the marking engines may include its own dedicated print media source instead of or in addition to those of the print media source processing unit 6.

The print media conveyor 18 is controllable by the controller 4 to acquire sheets of a selected print medium from the print media sources 20, 22, 24, 26, transfer each acquired sheet to one or more of the processing units 8, 10, 12, 14 to perform selected marking tasks, transfer each sheet to the finisher 16 to perform finishing tasks according to a job description associated with each sheet and according to the capabilities of the finisher.

The finisher unit 16 can include one or more print media destinations 28, 30, and 32. While three destinations are illustrated, the printing system 2 can include X print media destinations, where X is an integer greater than or equal to one. The finisher unit 16 deposits each sheet after the processing in one of the print media destinations 28, 30, 32, which can include trays, pans, etc. While only one finisher is illustrated, it is contemplated that two, three, four or more finishers can be employed in the printing system 2.

The print media conveyor 18 can pass through each of the processing units 8, 10, 12, 14 to provide a bypass route in which the sheets can pass through the processing units 8, 10, 12, 14, 16 without interacting therewith. Branch paths are also provided in each processing unit 8, 10, 12, 14 to take the sheet off the conveyor 18 and into the functional portion of the processing units 8, 10, 12, 14 and to deliver the processed sheet back to the conveyor 18. In the processing unit 16, the branch paths are presently removed along with the functional portion; however, the bypass portion of the conveyor 18 remains in the processing unit 16 so as to maintain continuity of the print media conveyor 18. The conveyor 18 may also include other branch junction points, such as, for example, the branch junction points 34 and 36 to enable the conveyor to pass sheets along selected paths in the illustrated multiple-path conveyor configuration. This provides the illustrated arrangement in which the marking engine processing units 8, 10, 12, 14 are arranged two-dimensionally. In a linear arrangement of processing units (not illustrated), the branch junction points 34 and 36 are suitably configured.

The printing system 2 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. In general, some sheets may have mixed color and black-and-white printing. Execution of the print job may also involve collating the sheets in a certain order. Still further, the print job may include folding, stapling, punching holes into, or otherwise physically manipulating or binding the sheets. The printing, finishing, paper-handling, and other processing operations that can be executed by the printing system 2 are determined by the capabilities of the processing units 6, 8, 10, 12, 14, 16, 18 of the printing system 2. Those capabilities may increase over time due to addition of new processing units or upgrading of existing processing units. Those capabilities may also decrease over time due to failure or removal of one or more processing units, such as the illustrated removed functional portion of processing unit 14.

Print jobs can be supplied to the printing system 2 in various ways. A built-in optical scanner 38 can be used to scan a document such as book pages, a stack of printed pages, or so forth, to create a digital image of the scanned document that is reproduced by printing operations performed by the printing system 2. Alternatively, a print job can be electronically delivered to a system controller (not shown) via a wire or wireless connection by a remote device such as another print platform, a computer, etc. For example, a network user operating word processing software running on a remote computer may select to print the word processing document on the printing system 2, thus generating a print job, or an external scanner (not shown) connected to the network may provide the print job in electronic form. It is also contemplated to deliver print jobs to the printing system 2 in other ways, such as via CD, DVD, optical disk, magnetic tape, flash memory, etc., or using a dedicated computer connected only to the printing system 2.

An interface 40 provides a mechanism for interaction between the printing system 2 and a user. The interface 40 displays various menus and enables the user to configure the printing system 2 and/or print jobs. The user interacts with the user interface 40 to navigate through menus, select options, configure the printing system 2, activate a particular function in connection with a multi-functional platform (e.g., print, copy, scan . . . ), retrieve messages, etc. By way of example, a user desiring to produce several copies of a document can interact with the user interface 40 to activate a copy menu, input a number of copies, define paper type (e.g., letter, A4 . . . ), set print quality (e.g., resolution) and color (e.g., grey scale, color . . . ), etc. This information is provided to the control component 4, which executes instructions to produce the copies based on the user input. As described previously, the control component 4 also controls various other aspects of the printing system 2 such as warm up routines, transitions into and out of low power inactivity modes, loading software, firmware and applications, routing print jobs to the processing units 8, 10, 12, 14, etc.

The printing system 2 is illustrative. In general, any number of print media sources, media handlers, marking engines, collators, finishers or other processing units can be connected together by a suitable print media conveyor configuration. While the printing system 2 illustrates a 2×2 configuration of four marking engine processing units or image marking engines (IME) 8, 10, 12, 14, buttressed by the media source unit 6 on one end and by the finisher unit 16 on the other end, other physical layouts can be used, such as an entirely horizontal arrangement, stacking of processing units three or more units high, or so forth. Moreover, while in the printing system 2 the marking engine processing units 8, 10, 12, 14 have removable functional portions, in some other embodiments some or all processing units may have non-removable functional portions and/or field replaceable units. It will be appreciated that even if the functional portion is non-removable, the provision of the print media conveyor 18 with bypass paths through each intermediate processing unit enables the processing unit to be taken "off-line" for repair or modification while the remaining processing units of the printing system continue to function as usual.

In some aspects, separate bypasses for intermediate components may be omitted. The "bypass path" of the conveyor in such configurations suitably passes through the functional portion of a processing unit, and optional bypassing of the processing unit is effectuated by conveying the sheet through the functional portion without performing any processing operations. Still further, in some aspects the printing system may be a cluster of networked or otherwise logically interconnected printers each having its own associated print media source and finishing components.

The plurality of processing units 6, 8, 10, 12, 14, 16 and flexible print media conveyor 18 enables the printing system 2 to have a large number of capabilities and features. Each marking engine 8, 10, 12, 14, for example, has associated low-level print settings such as xerographic voltages, fuser temperatures, toner reproduction curves (TRC), and so forth. Some of these low-level print settings are optionally modified depending upon the sequence along which a given sheet passes through the printing system 2; for example, it may be advantageous to modify the fusing temperatures of serially performed xerographic processes. At a higher functional level, each marking engine has associated functional parameters such as contrast, resolution, and so forth.

Typically, the user has certain user preferences regarding performance of the printing system 2. The user ideally wants a highly efficient or productive printing (that is, a high throughput of sheets and print jobs through the printing system 2), high printing quality, image quality consistency across each print job, and so forth. At the same time, the user typically wants the printing system 2 to maintain high reliability (that is, minimize the down-time of the printing system 2), low run cost (achieved, for example, by minimizing cycling of processing units between idle and active states), low service costs (achieved, for example, by distributing usage of consumable elements across similar processing units), high energy efficiency, and so forth.

Figure 2:
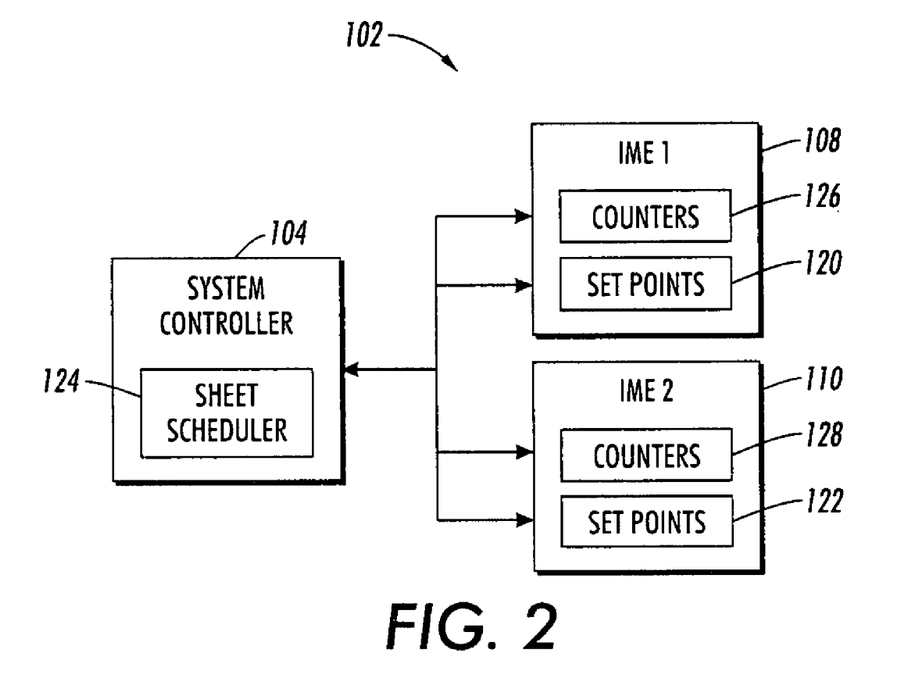

With reference to FIG. 2, a schematic illustration of a method for predicting continued healthy status and preemptively altering or overriding process control protocols of a print system, or partial system 102, is illustrated. It will be appreciated that the method may include fewer, more, or different steps and that the steps need not be performed in the order specified. The method is described hereinafter. For purposes of discussion, it will be assumed that the printing system 102 is fully operational, although in a continuously operating system, this need not be the case. The operating modules 108, 110 of the printing system 102 can be monitored. Such monitoring may involve running self-diagnostics, tracking and trending fault and error counters, error logs, history logs, component usage, sensor values, actuator values, et al.

The method for predicting the impending off-line state of one or more modules of a printing system 102 having a plurality of modules can comprise a system controller 104 that tracks process control protocols of each one of the plurality of modules 108, 110 and compares to a scheduled job run and selectively alters the control variable or set point 120, 112 of at least one of the process control protocols thereby preemptively altering initiation of at least one process control protocol to process the job run uninterrupted. The method can further comprise rescheduling via a sheet scheduler 124, one of an unprocessed job and a partially processed job preemptively based on the altered initiation of at least one process control protocol to process unprocessed portions of the job. The altering initiation of at least one process control protocol can be selectively either before or after reaching one or more predetermined threshold limit or set points 120, 122. The system controller 104 can track and trend control variable data and compare the data to predetermined threshold limits to predict the impending process control protocol of at least one module. The control variable data can be selected from the group consisting of one or more of print counters, error counters, parts usage counters, sensors, process loop actuators, service history and user input collectively referenced as counters 126, 128 associated with the plurality of modules.

In another exemplary arrangement, the method for scheduling jobs in a printing system 102 with multiple marking engines and multiple print media components can comprise the system controller 104 predicting an impending process control protocol taking a marking engine off-line. The system controller 104 can track the impending off-line state wherein the system controller 104 tracks and trends control variable data selected from the group consisting of one or more of print counters, error counters, parts usage counters, sensors, process loop actuators, service history and user input 126, 128 associated with the plurality of modules 108, 110 and compares the data to predetermined threshold limits 120, 122 to selectively override the impending process control protocol of at least one module. Overriding the process control protocol can further comprise individual image marking engine self diagnostics and comparisons of the resulting diagnostic data to predetermined threshold limits. The system controller 104 can resume the process control protocol after a job run has terminated.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system, comprising
a plurality of print processing modules which selectively transfer print media therebetween during printing;
a system controller that tracks process control protocols of each one of the plurality of modules and compares to a scheduled job run and selectively alters a control variable of at least one of the process control protocols thereby preemptively altering initiation of at least one process control protocol to process the job run uninterrupted;

the plurality of modules include at least one source that provides a print media substrate, a first marking engine, and a second marking engine, the plurality of modules further includes at least another source that provides a conveyer system wherein the conveyer system selectively transfers print media to at least the first marking engine, the second marking engine, or between the first marking engine and the second marking engine; and, wherein the system controller trends control variable data and compares the data to predetermined threshold limits to predict the impending process control protocol of at least one module and to preemptively alter initiation of at least one process control protocol thereby processing the job run uninterrupted.

2. The printing system of claim 1, wherein the system controller uses the full capabilities of the at least one module to process a job until predicted to go off-line and then bypasses the now off-line module to process the remaining part of the job.

3. The printing system of claim 1, wherein the system controller determines when the at least one module will go off-line and return on-line and thus bypass and schedule the at least one module accordingly thereby preventing collisions and maintaining sheet order.

4. The printing system of claim 1, wherein the predetermined threshold limits are associated with variable processing capabilities of each of the print processing modules.

5. The printing system of 1, wherein the altering the at least one control variable of at least one process control protocol occurs with human intervention, without human intervention, or a combination thereof.

6. The printing system of claim 1, wherein the plurality of processing modules are independently selected from the group consisting of print media substrate sources, marking engines, conveyor systems, inverters, and finishers.

7. The printing system of claim 6 wherein the system includes multiple marking engines and the system controller redirects jobs from an impending off-line marking engine to an on-line marking engine.

8. The printing system of claim 1, wherein the plurality of modules includes marking modules that are in a stacked arrangement according to one of vertically, horizontally, and vertically and horizontally to form one of a tandem, a parallel, and a cluster printer.

9. The printing system of claim 1, wherein the plurality of modules include one or more of an electrophotographic printer, an ink-jet printer, a solid ink printer, and a thermal head printer.

10. The printing system of claim 1, wherein the plurality of modules include one or more of a black, a custom color, a process color, a highlight color, and a magnetic ink character recognition marking engine.

11. The system of claim 1, wherein the system is a xerographic apparatus.

12. The printing system of claim 1, wherein the system controller executes diagnostics and comparisons to the threshold limits of the process control protocols to determine the impending off-line state of the at least one module.

13. The printing system of claim 1, wherein altering initiation of at least one process control protocol is selectively either before or after reaching one or more predetermined threshold limit.

14. A method for predicting the impending off-line state of one or more modules of a printing system having a plurality of modules, comprising:

a system controller that tracks process control protocols of each one of the plurality of modules and compares to a scheduled job run and selectively alters a control variable of at least one of the process control protocols thereby preemptively altering initiation of at least one process control protocol to process the job run uninterrupted;

rescheduling one of an unprocessed job and a partially processed job preemptively based on the altered initiation of at least one process control protocol to process unprocessed portions of the job;

wherein altering initiation of at least one process control protocol is selectively either before or after reaching one or more predetermined threshold limit;

wherein the system tracks and trends control variable data and compares the data to predetermined threshold limits to predict the impending process control protocol of at least one module; and, wherein the system controller selectively delays initiation of the control of at least one of the process control protocols thereby preemptively delaying initiation of at least one process control protocol in order to process the job run uninterrupted.

15. The method of claim 14, wherein the control variable data is selected from the group consisting of one or more of print counters, error counters, parts usage counters, sensors, process loop actuators, service history and user input associated with the plurality of modules.

16. A method for scheduling jobs in a printing system with multiple marking engines and multiple print media components, comprising:

a system controller predicting an impending process control protocol taking a marking engine off-line;

the system controller tracking the impending off-line state wherein the system controller tracks and trends control variable data selected from the group consisting of one or more of print counters, error counters, parts usage counters, sensors, process loop actuators, service history and user input associated with the plurality of modules, and compares the data to predetermined threshold limits to selectively override the impending process control protocol of at least one module;

wherein overriding the process control protocol further comprising individual image marking engine self diagnostics and comparisons of the resulting diagnostic data to predetermined threshold limits;

wherein the system controller tracks and trends controlled variable data and compares the data to predetermined threshold limits to predict the impending process control protocol of at least one module; and, wherein the system controller selectively alters the control variable of at least one of the process control protocols thereby preemptively altering initiation of at least one process control protocol to process the job run uninterrupted.

17. The method of claim 16, wherein the system controller resumes the process control protocol after a job run has terminated.

* * * * *